United States Patent
Hagerman et al.

(10) Patent No.: US 8,135,439 B2
(45) Date of Patent: Mar. 13, 2012

(54) RESOURCE SCHEDULING IN WIRELESS COMMUNICATION SYSTEMS USING BEAM FORMING

(75) Inventors: Bo Hagerman, Tyresö (SE); Bo Göransson, Sollentuna (SE); Davide Imbeni, Modena (IT); Riccardo De Bernadi, Naviglio MI (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 608 days.

(21) Appl. No.: 12/307,871

(22) PCT Filed: Dec. 21, 2006

(86) PCT No.: PCT/SE2006/001480
§ 371 (c)(1),
(2), (4) Date: Jan. 7, 2009

(87) PCT Pub. No.: WO2008/004922
PCT Pub. Date: Jan. 10, 2008

(65) Prior Publication Data
US 2009/0258654 A1    Oct. 15, 2009

Related U.S. Application Data

(60) Provisional application No. 60/818,980, filed on Jul. 7, 2006.

(51) Int. Cl.
*H04M 1/00*    (2006.01)

(52) U.S. Cl. .......... 455/562.1; 455/101; 455/63.4; 455/522; 455/69; 370/344; 370/339; 370/342; 370/332

(58) Field of Classification Search .......... 455/101, 455/562.1, 63.4, 522, 69; 370/334, 339, 370/342, 318, 332
See application file for complete search history.

(56) References Cited

U.S. PATENT DOCUMENTS

| | | | |
|---|---|---|---|
| 2004/0047328 A1 * | 3/2004 | Proctor et al. | 370/342 |
| 2005/0064872 A1 | 3/2005 | Osseiran et al. | |

FOREIGN PATENT DOCUMENTS

EP    1615457 A1    1/2006

* cited by examiner

*Primary Examiner* — Kamran Afshar
*Assistant Examiner* — Dung Lam

(57) ABSTRACT

A basic idea of the invention is to provide multi-user resource scheduling and distribution based on balancing the power resources used for the different narrow beams in order to smooth the interference levels over the whole cell, area and to reduce interference fluctuations. The resource scheduling principle according to the invention is especially useful when the available resources are not fully utilized. The idea is to select, for each antenna beam of at least a subset of the antenna beams, at least two mobile users for service using the respective antenna beam during a transmission time interval, and to distribute power resources to the antenna beams for use during the transmission time interval based on the guideline of balancing the power resources among different antenna.

11 Claims, 7 Drawing Sheets

RESOURCE SCHEDULING IN WIRELESS COMMUNICATION SYSTEMS USING BEAM FORMING

This application claims the benefit of U.S. Provisional Application No. 60/818,980, filed Jul. 7, 2006, the disclosure of which is fully incorporated herein by reference.

TECHNICAL FIELD

The present invention generally relates to wireless or cellular communication and more particularly to advanced resource scheduling.

BACKGROUND

The use of adaptive or smart antennas is considered as one of the key features for increasing coverage and capacity of a wireless or cellular system. When beamforming is applied in the base station several narrow beams, compared to the sector/cell beam, may be created to maintain coverage in the cell. FIG. 1A illustrates a sector cell antenna beam. Although a sector antenna is useful to communicate broadcast and/or control information to all mobiles in the sector cell, an adaptive antenna may be used to transmit and receive in narrow beams covering just a part of the sector cell. FIG. 1B shows an example of a narrow antenna beam. FIG. 2 illustrates an example of a cellular network with a base station transmitting a sector beam, a base station transmitting one of the possible beams in a multi-beam system, and a base station transmitting a steerable beam. Some benefits of adaptive antennas are shown in FIG. 3, where a narrow beam of the adaptive antenna may be directed to an intended mobile and therefore spreads less interference in the download direction. The narrow beam also suppresses spatial interference from adjacent cell interferers in the uplink direction. Both factors increase the signal-to-interference gain, and therefore increase the overall system performance.

HSDPA (High Speed Data Packet Access) is another important feature that enables improvements in capacity and end-user perception by means of efficient sharing of common resources in the cell among many users, rapid adaptation of the transmission parameters to the instantaneous radio channel conditions, increased peak bit rates and reduced delays.

Fast scheduling is the mechanism selecting which users to transmit to in a given transmission time interval (TTI). The scheduler is a key element in the design of a HSDPA system as it controls the allocation of the shared resources among the users and to a great extent determines the overall behavior of the system. In fact, the scheduler decides which users to serve and, in close cooperation with the link adaptation mechanism, which modulation, power and how many codes should be used for each user. This produces the actual end-users bit rate and system capacity.

In order to improve the system capacity in terms of total cell throughput, the scheduling algorithm normally bases its decision primarily on the channel conditions experienced by the user equipment (UE); however, it can be designed in a flexible way so as to consider other aspects such as the fairness from a time resource perspective or the average bit rate.

In a WCDMA HSDPA system, a channel quality indication (CQI) is reported by the UE and used for scheduling and link adaptation. Since the CQI is strictly connected to the quality of a common pilot signal, it is strongly affected by the interference levels.

The fast scheduler, normally located in the radio base station (RBS), targets which users to serve in each TTI and distributes the available channelization codes and power resources among the selected users. In case code multiplexing is applied, more than one user can be served in the same TTI by using distinct parts of the set of channelization codes allocated for the HSDPA related channels. Several scheduling algorithms that can be used to enforce specific strategies in terms of trade-off between system capacity and user fairness are available in the literature. The most common algorithms are described below.

The round robin (RR) algorithm allocates radio resources to the users on a sequential basis and it does not base its decision on the instantaneous radio channel conditions experienced by the connection. The system performance is not maximized even though a certain degree of fairness is obtained in terms of access to the radio resources.

The proportional fairness (PF) scheduler better exploits the channel conditions and ensures that all users receive a guaranteed minimum throughput, providing fairness among users together with system performance improvement. The scheduler transmits information to some users based on CQI information, delay and other measurements.

The maximum C/I algorithm bases the user selection solely on the CQI information reported by the UE.

The CQI report in WCDMA multi-beam antenna system is based on the quality of the Secondary Common Pilot Channel (S-CPICH).

However, existing solutions do not enable the system to benefit from the capacity/coverage gains promised by narrow beam/adaptive antenna techniques.

SUMMARY

It is a general object of the present invention to improve scheduling for cellular communication using multi-beam antenna systems.

It is an object to improve the possibility to secure and achieve the system capacity/coverage gains promised by narrow beam/adaptive antenna techniques, and efficiently explore the available radio resources.

It has been recognized that a problem of a scheduling algorithm applied in a multi-beam antenna system is how to manage the interference variations. For example, existing solutions do not enable the system to benefit from the spatial interference filtering provided by the narrow beams and are not designed to avoid large interference variations caused by sudden changes in the transmission power of different narrow beams. This may lead to incorrect detection of the received data at the user equipment side, a lot of retransmissions and, in the end, inefficient exploration of the available radio resources.

The present invention addresses this and similar/associated problems, and proposes an advanced Resource Scheduling Mechanism for Multi-beam Antenna Systems based on beam power balancing. The invention is generally applicable to resource scheduling, but particularly useful in HSDPA systems with narrow beam capabilities.

A basic idea of the invention is to provide multi-user resource scheduling and distribution based on balancing the power resources used for the different narrow beams in order to smooth the interference levels over the whole cell area and to reduce interference fluctuations. The resource scheduling principle according to the invention is especially useful when the available resources are not fully utilized. The idea is to select, for each antenna beam of at least a subset of the antenna beams, at least two mobile users for service using the respective antenna beam during a transmission time interval, and to distribute power resources to the antenna beams for use during the transmission time interval based on balancing the power resources among different antenna.

It should be understood that the beam balancing condition is intended for use as a guideline when distributing power resources to the different antenna beams.

In general, a benefit of the beam balancing principle in multi-user resource scheduling is that for example CQI measurement reports from the UEs in the coverage area of the cell will be more reliable, and will provide a good basis for fast scheduling and fast link adaptation. In addition, the spatial filtering provided by the narrow beams reduces the absolute levels of interference generated within the cell, leading to substantially improved throughput rates as well as individual peak rates both in the specific cell as well for the neighboring cells.

Other advantages offered by the invention will be appreciated when reading the below description of embodiments of the invention.

DESCRIPTION OF EMBODIMENTS

Figure 1A:
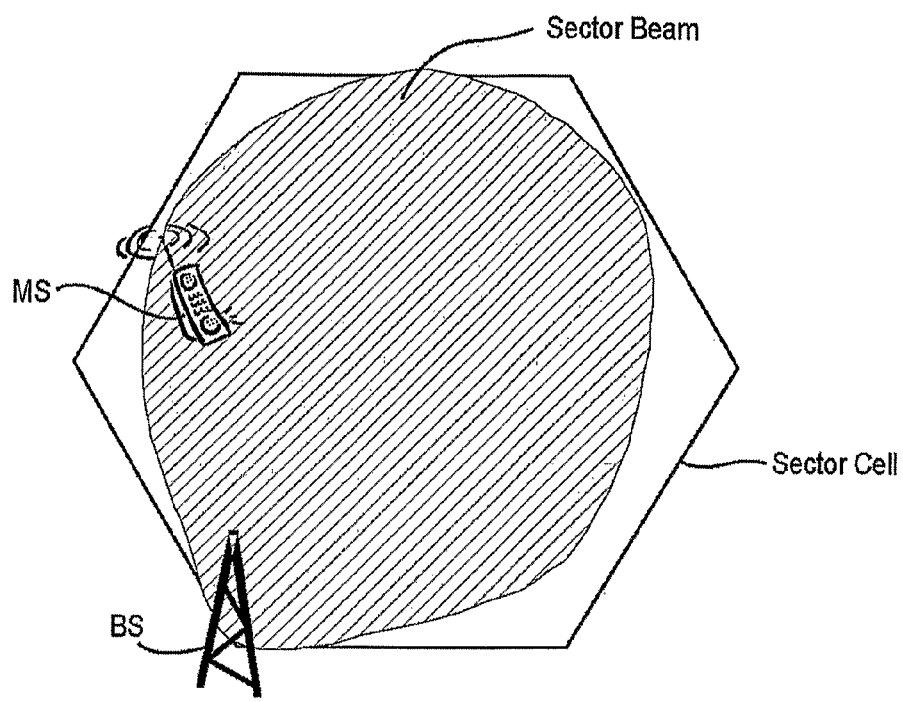
FIG. 1A illustrates a sector cell antenna beam.
Figure 1B:
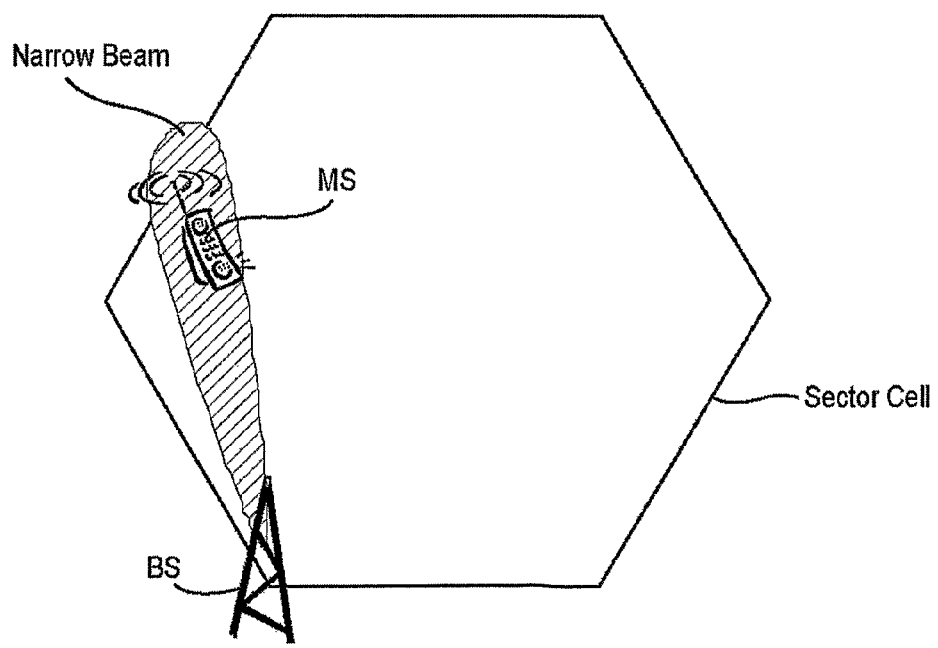
FIG. 1B shows an example of a narrow antenna beam.
Figure 2:
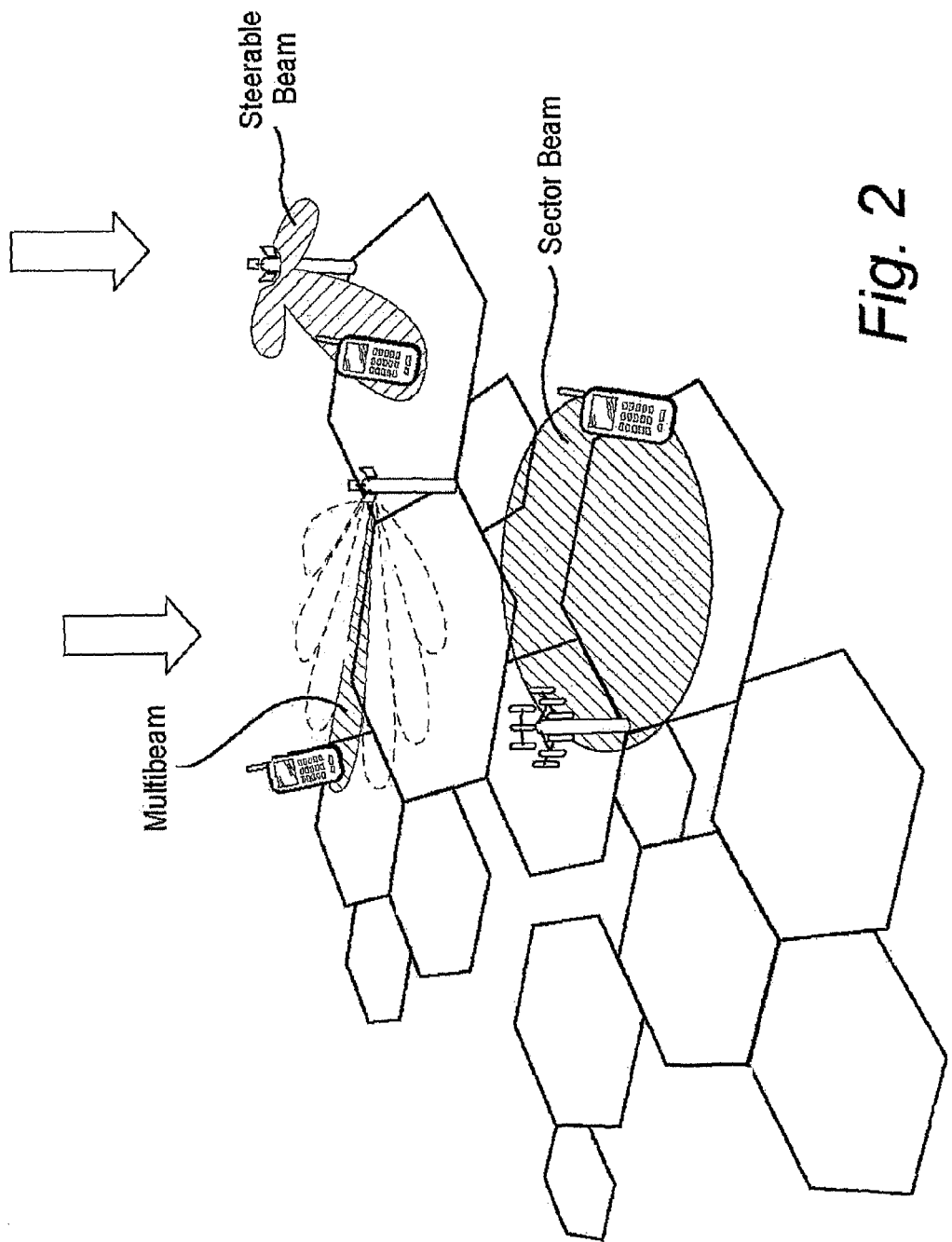
FIG. 2 illustrates an example of a cellular network with a base station transmitting a sector beam, a base station transmitting one of the possible beams in a multi-beam system, and a base station transmitting a steerable beam.
Figure 3:
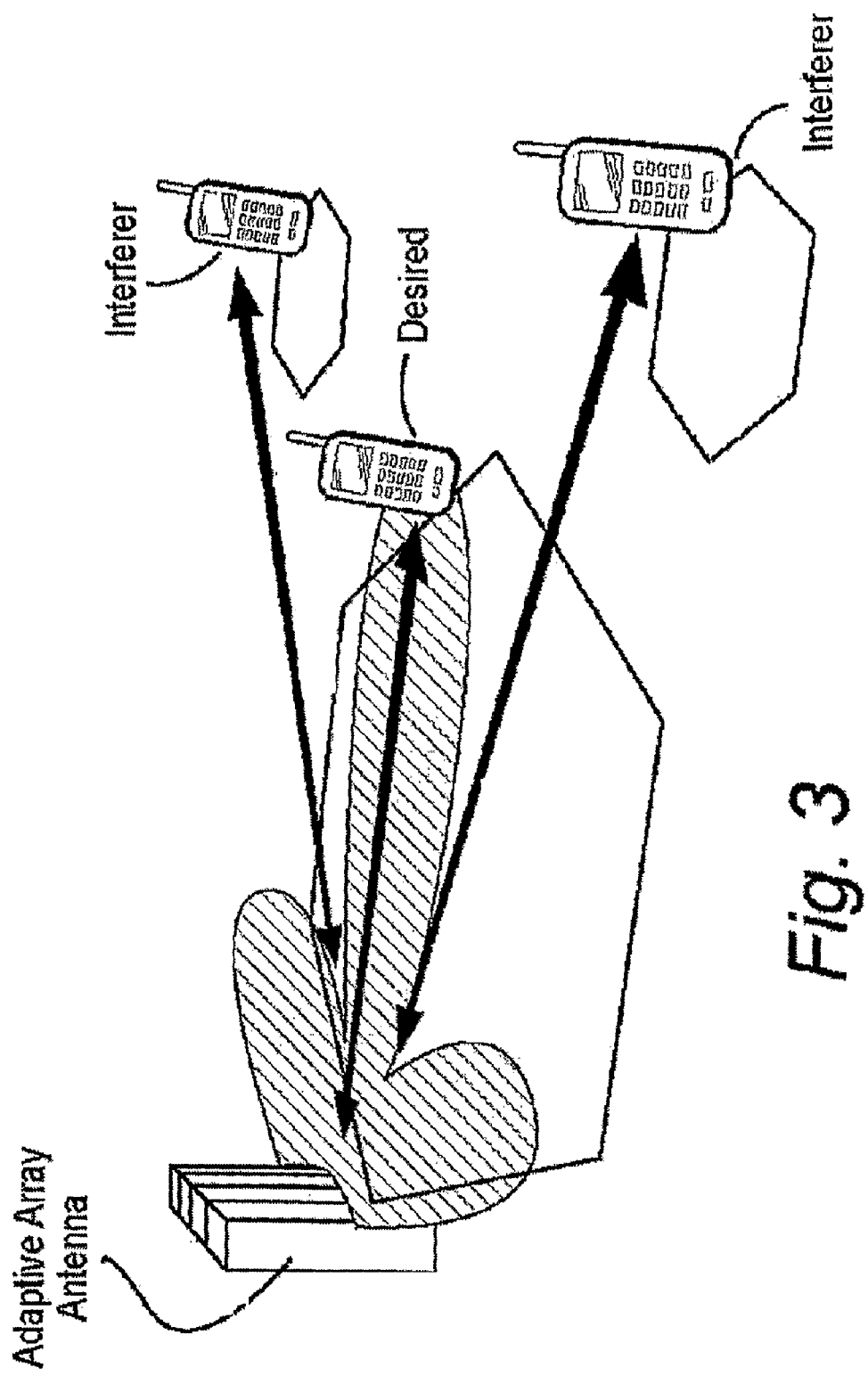
FIG. 3 illustrates how a narrow beam of an adaptive antenna may be directed to an intended mobile and therefore spreads less interference in the download or downlink direction.

For a better understanding of the invention, it may be useful to begin with a brief overview and analysis of the prior art techniques.

As mentioned, the inventors have recognized that a primary problem of a scheduling algorithm for a multi-beam antenna system is how to manage the interference variations. The existing conventional solutions do not enable the system to benefit from the spatial interference filtering provided by the narrow beams and are typically not designed to avoid large interference variations caused by sudden changes in the transmission power of different narrow beams. In case that happens, the CQI used for the scheduling and link adaptation decisions may not reflect the actual interference level when the user is actually scheduled, leading to incorrect detection of the received data at the user equipment side, a lot of retransmissions and, in the end, inefficient handling and poor utilization of the available radio resources.

The unbalanced transmission in the different beams also increases the momentary interference peaks towards neighboring cells and affects their performance.

More specifically, the interference levels depend on several factors such as: the position within the cell, the fast fading, the instantaneous transmission activity of neighbor cells and, in case of a time-dispersive channel, the transmission activity of the own cell. The instantaneous own cell interference can be significant in case of application of beamforming, as a large amount of the RBS power can be steered towards a specific narrow beam. In that case, the CQI reported by the UEs in that beam will degrade compared with a situation where the power is more balanced among different beams. Another important issue is that the scheduling and link adaptation must rely on "reliable" CQI from the UEs. This might not occur if there are sudden interference level variations due to the fact that all the RBS power is transmitted in one beam during a certain TTI and in another beam in the next TTI. Unreliable CQI reports imply incorrect scheduling and link adaptation decisions which in turn result in a lower capacity, and under-utilization of available resources if a channel is believed to be worse than is really the case.

US patent application US 2006/0067269 published on Mar. 30, 2006 relates to a method of scheduling users in wireless communication networks, where the selection of additional users of a group within a sector of a cell, to be simultaneously scheduled with already scheduled user(s) of the same group, may be based on spatial information of the users in the group. The spatial information for each user within a sector of a cell includes an incidence angle of arrival of a transmission signal to the user with respect to a 0° sector border.

The US 2006/0067269 patent application mainly concerns the so-called code limitation problem.

US patent application US 2005/0064872 published on Mar. 24, 2005 concerns reducing shared downlink radio channel interference by transmitting to multiple mobiles using multiple antenna beams. Multiple mobiles are selected to receive transmissions over the shared radio channel during a predetermined transmission time interval. The scheduler selects one mobile per each antenna beam. The scheduler also monitors the available channel resources, and employs some type of resource allocation method for allocating resources for each antenna beam transmission for each transmission time interval. The radio resources are divided evenly between the selected mobile radios, or alternatively divided in proportion to each mobile's reported channel quality.

Although US patent application US 2005/0064872 provides a quite satisfactory solution there is still room for improvement as will be explained below.

Figure 4:
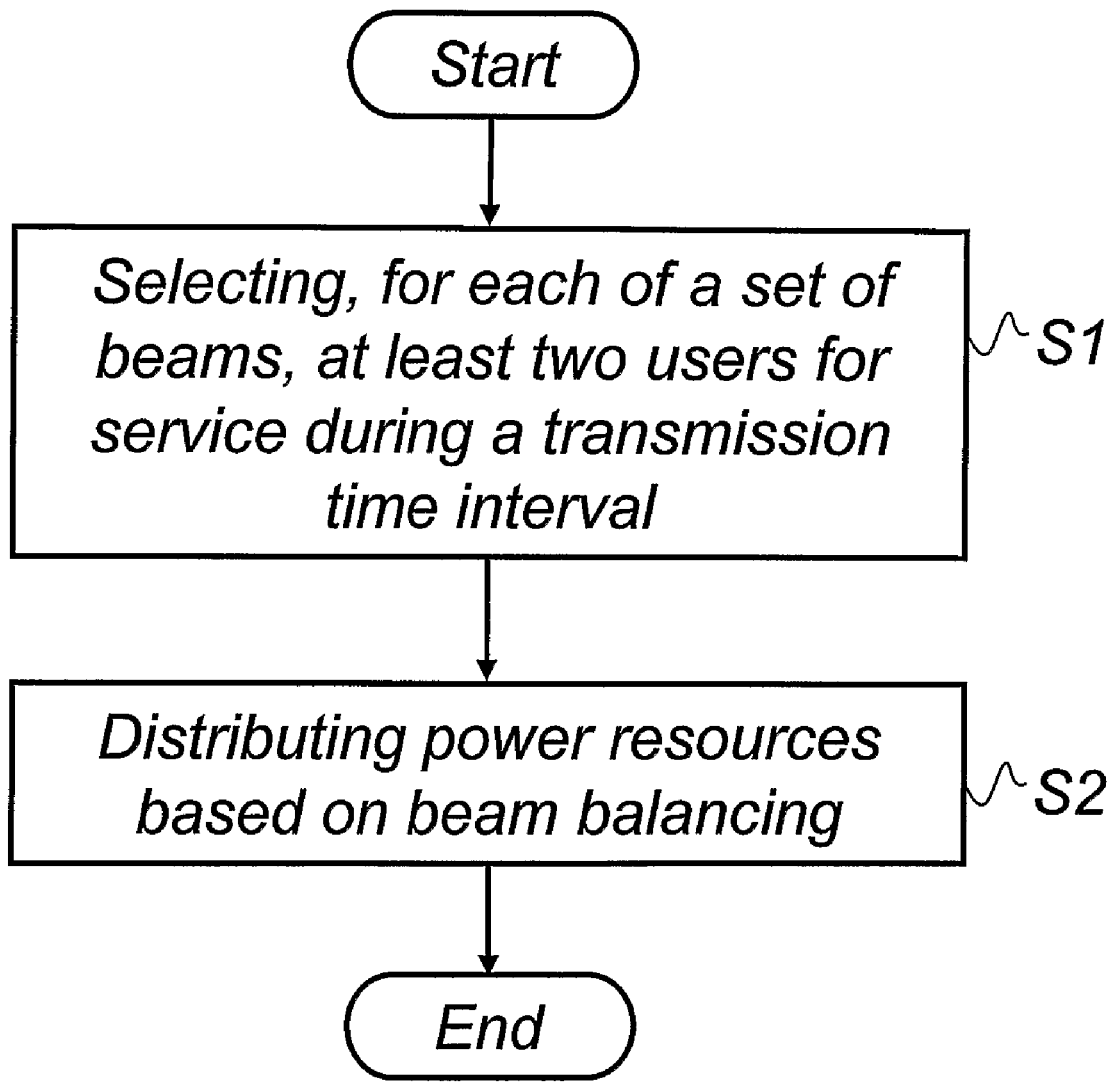
FIG. 4 is a schematic flow diagram illustrating a preferred exemplary embodiment of the invention.

The present invention addresses this and similar/associated problems, and proposes an advanced Resource Scheduling Mechanism for Multi-beam Antenna Systems based on beam power balancing. This mechanism is preferably implemented as a method and a corresponding arrangement or system. A basic concept of the present invention is to balance the power resource used for the different narrow beams (preferably in every TTI) in order to smooth the interference levels over the whole area covered by the cell and to reduce interference fluctuations. Reference can be made to the schematic flow diagram of FIG. 4.

The proposed multi-user resource scheduling mechanism is based on the general principle of selecting multiple mobile users to be scheduled for service using multiple narrow antenna beams during a predetermined transmission time interval, in similarity to co-pending US patent application US 2005/0064872 mentioned above. However, here the idea is to select, for each antenna beam of at least a subset of the antenna beams of the radio base station, multiple (i.e. at least two) mobile users for service using the respective antenna beam during a transmission time interval (S1), rather than a single user per beam. If there are available resources, the idea according to the invention is normally to allocate multiple mobile users per beam (at least for a subset of the beams). Furthermore, in accordance with the invention, the power resources are distributed to the antenna beams for use during the considered transmission time interval based on balancing the power resources among different antenna beams (S2), rather than distributing the power evenly among the users.

Understanding that the beam balancing principle is normally used as a guideline, the mobile users served by a cell may for example be scheduled so that the number of users or the corresponding total transmitted power is "evenly" or "homogeneously" distributed among/over the different narrow beams of the cell to provide a more homogeneous or "spatially white" interference situation.

With multiple scheduled users per beam (for at least a number of the beams) per TTI, it is often better to distribute the power resources based on balancing the power resources among the beams, rather than distributing the power evenly among the users, as can be understood from the following illustrative example.

Figure 5:
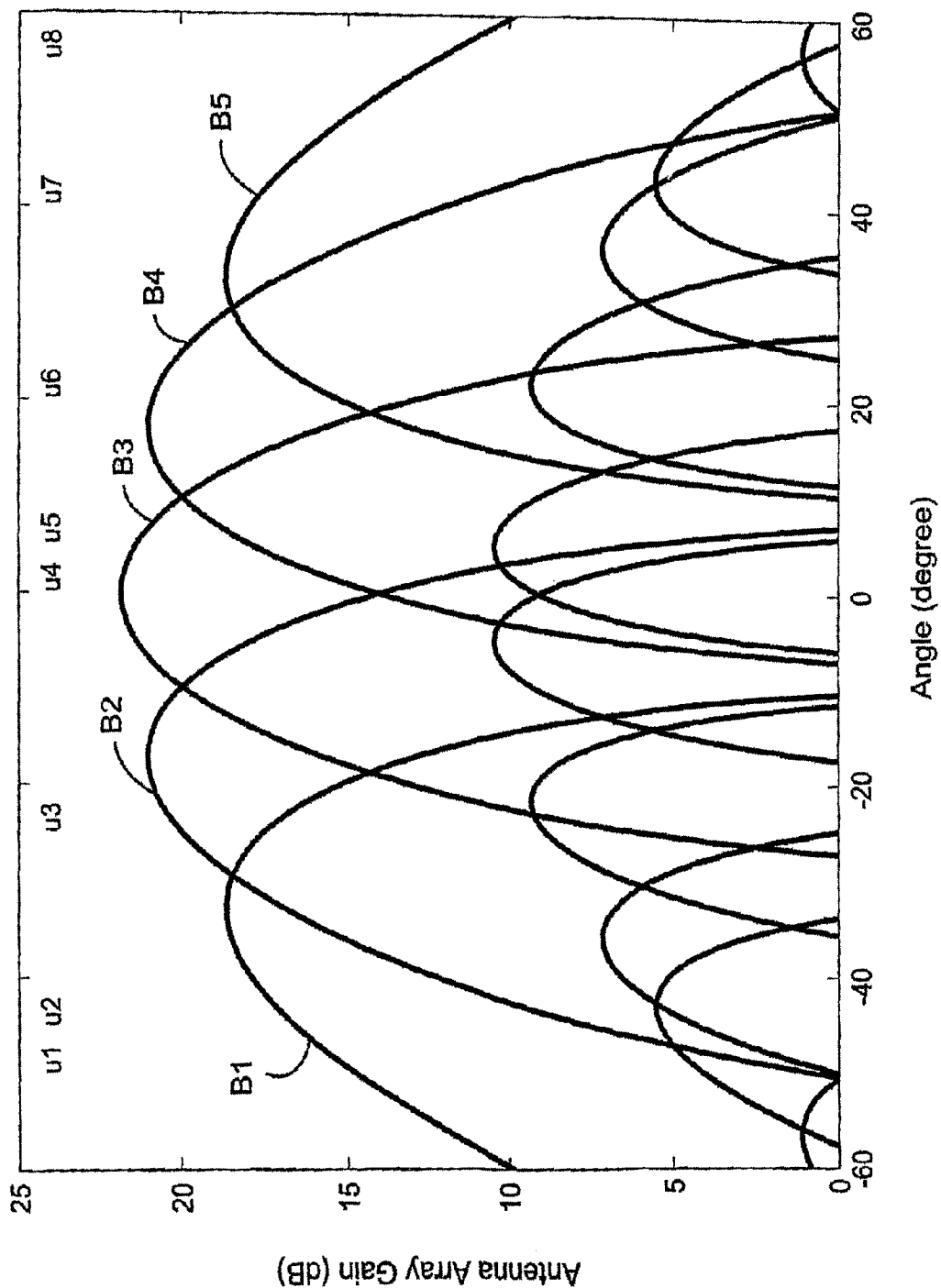
FIG. 5 is a schematic diagram illustrating an example of a multiple antenna beam transmission in a transmission time interval.

For a better understanding of the invention it may be useful to consider an illustrative example with reference to the schematic diagram of FIG. 5. Consider five different narrow beams B1, B2, B3, B4 and B5, with eight users u1-u8 scheduled for service during a transmission time interval. In this particular example, two users (u1, u2) are scheduled in B1, one user (u3) in B2, two users (u4, u5) in B3, one user (U6) in B4 and two users (u7, u8) in B5.

If the power resources would be distributed evenly among the eight users, each user would be allocated 12.5% of the total available power. In effect, this would mean that B1 (having two users) is assigned 25%, B2 (with only one user) is assigned 12.5%, B3 (two users) is assigned 25%, B4 (one user) is assigned 12.5% and B5 (two users) is assigned 25% of the power resources. As can be seen there is a quite significant difference between the different beams. B1, B3 and B5 have twice the power of B2 and B4.

However, by using the principle of beam balancing the guideline will be to assign 20% of the power resources to each beam. In practice, this may for example turn into something like 21.4% to B1, 18.7% to B2, 20.2% to B3 and 21.8% to B4, and 17.9% to B5, which results in a much more balanced and smoothed interference situation in the entire cell.

For comparison, it should be understood that with the scheme proposed according to US patent application US 2005/0064872 only five of the eight mobile users are selected to receive transmissions during a transmission time interval; one mobile per beam.

Normally, the invention aims at balancing the power resources within any given transmission time interval. Alternatively, however, the invention aims at balancing the power resources averaged over a period of several transmission time intervals.

The invention can also be adapted to handle situations when there are no active users in one or more beams, while still adhering to the overall principle of beam balancing. For example, if there are no active mobile users in a given beam, more power resources can be allocated to antenna beams that are direct neighbors of the given antenna beam than to more distant antenna beams to balance or smooth the power resource distribution over the whole intended coverage area of the cell. Due to the normal beam overlap, the increased power in the neighboring "active" beams will "spill over" to the "inactive" beam and provide the desired smoothing.

Consider a small modification of the above example, assuming that there are no active users at all in B2, meaning that user u3 is not active during a given period of time. Then it may in fact be desirable to increase, at least for the given period of time when user u3 is inactive, the power resources in B1 and B3, for example to 30% of the power resources, resulting in an exemplary beam balancing guideline of 30% to B1, 30% to B3 and 20% to B4, and 20% to B5, assuming that B1 and B3 would "spill over" power to the "inactive" beam B2. Overall, considering the intended coverage area of the entire cell, this may result in a more smoothed and balanced interference situation, rather than giving 25% to each of the "active" beams B1, B3, B4, and B5.

In general, a benefit of the beam balancing principle in multi-user resource scheduling is that the CQI measurement reports from the UEs in the coverage area of the cell will be more reliable, and will provide a good basis for fast scheduling and fast link adaptation. In addition, the spatial filtering provided by the narrow beams reduces the absolute levels of interference generated within the cell, so the UEs will report higher CQIs (on average) and will achieve higher bit rates. Finally, by performing beam balancing within one or more cells, the interference patterns towards neighboring cells may also be smoothed, potentially leading to better performance for those cells as well.

The invention is generally applicable to resource scheduling, but particularly useful in HSDPA systems with narrow beam capabilities.

In a preferred exemplary embodiment of the invention, the selection of users in the overall scheduling mechanism works based on a ranking list of mobile users in a cell, while at the same time keeping track of spatial information represented by the narrow antenna beam in which each mobile user is located. Preferably, the selection procedure starts by selecting a best ranked mobile user from the ranking list for service by a given narrow antenna beam. Then the ranking list is traversed to select the following users not only by looking at the position in the ranking list but also by considering the spatial information so that a next user down in the list is located in another narrow antenna beam different from that of previously selected user(s) higher up in the ranking list. Once the end of the list is encountered the selection procedure starts over from the top of the list to select further mobile users, preferably until all considered users have been selected and/or the available power resources have been allocated.

The proposed advanced solution can for example be applied on top of one of the existing basic solutions (e.g. RR, PF, max C/I). It is for example assumed that the basic algorithms select the users to be scheduled in each TTI by picking the best ranked users in a per-cell priority list (obtained according to a certain scheduling function). However, the advanced solution of the invention also considers the "spatial" information, i.e. which beam the UE is located in, and aims at "balancing" (at least approximately) the power resources used in each beam in order to even out the interference levels in the cell.

Figure 6:
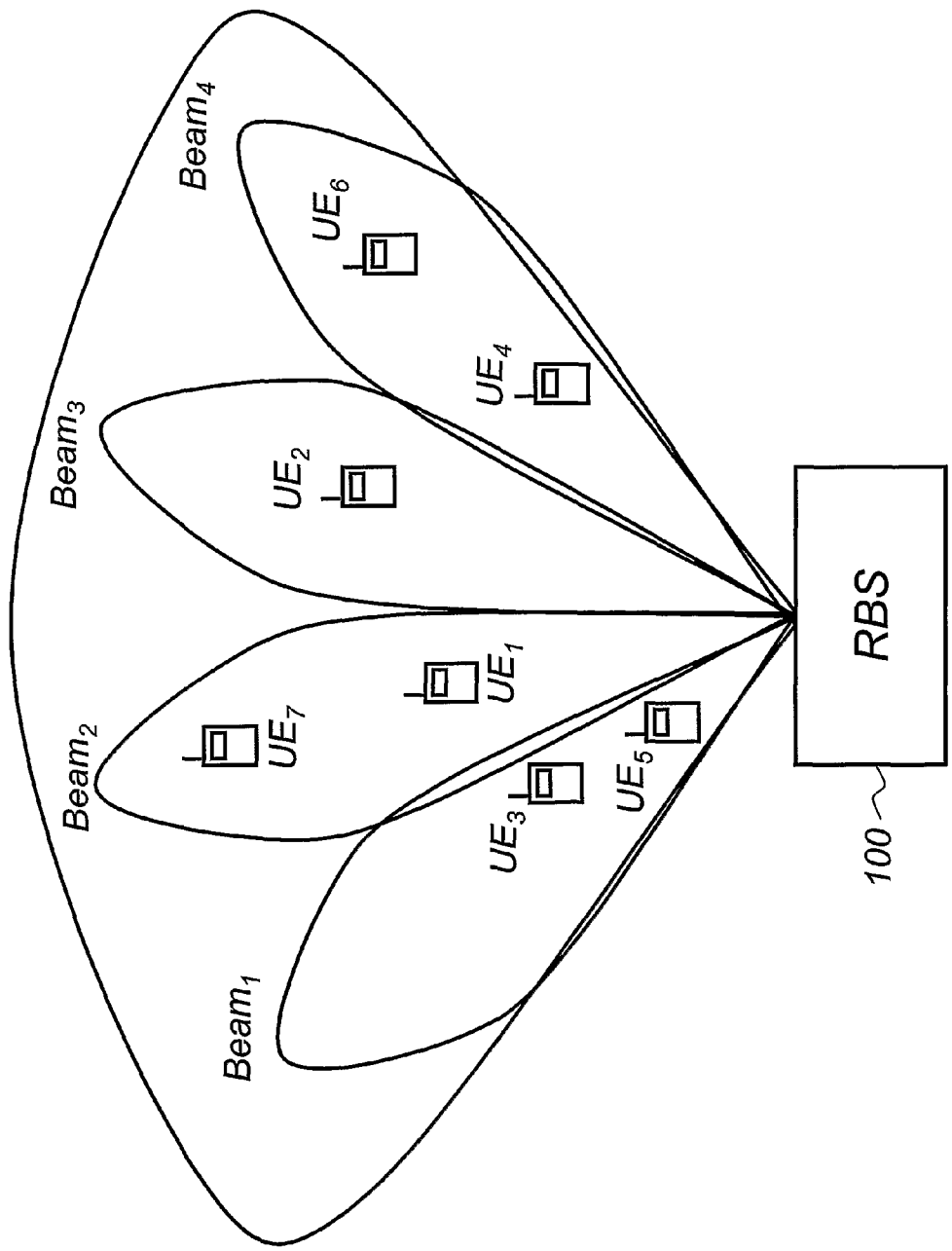
FIG. 6 is a schematic diagram illustrating a radio base station responsible for a cell split into four narrow beams and seven users to be served in a certain transmission time interval.
Figure 7:
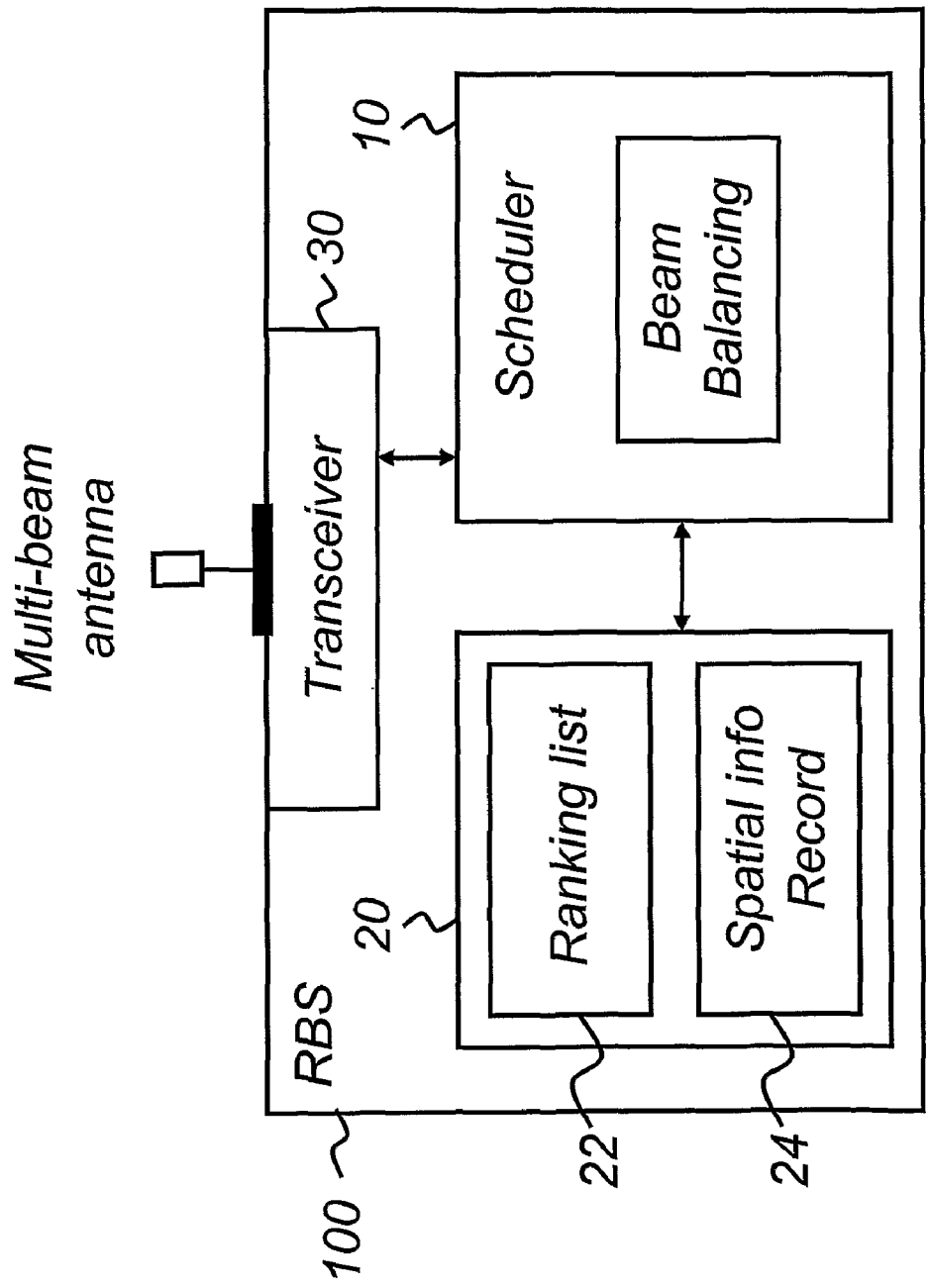
FIG. 7 illustrates relevant rudimentary portions of a radio base station (RBS) according to an exemplary embodiment of the invention.

The proposed solution can be illustrated with another example, considering the simple scenario outlined in FIG. 6; a single cell split in four narrow beams and seven users to be served in a certain TTI. Reference can also be made to FIG. 7, which illustrates the relevant rudimentary portions of an arrangement in a radio base station (RBS) according to an exemplary embodiment of the invention. In this example, the radio base station 100 basically comprises a scheduler 10 and associated data bases 20, and standard multi-beam transceiver functionality 30 with associated data buffers (not shown). Alternatively, the proposed scheduler may be implemented in another network node such as the radio network controller (RNC) or distributed between several nodes such as the RNC and RBS nodes.

The advanced scheduling algorithm creates a ranking list 22 (according to a certain function, e.g. based on CQI or equivalent quality indication) and also keeps track (in a separate record 24 or integrated with the ranking list 22) of the spatial information represented by the narrow beam in which the user equipment (UE) is located. This information is made available to the scheduler 10, e.g. by keeping track on which S-CPICH (or equivalent the cell-portion in 3GPP NodeB nomenclature) that the specific UE is associated to at channel assignment and activation by the radio network controller (RNC).

Table 1 below illustrates an example of a ranking list table including spatial information for the simple scenario exemplified in FIG. 6.

| User Equipment | Beam/Cell portion/ S-CPICH Index |
| --- | --- |
| UE5 | 1 |
| UE3 | 1 |
| UE1 | 2 |
| UE4 | 4 |
| UE6 | 4 |
| UE2 | 3 |
| UE7 | 2 |

The scheduling procedure executing in the scheduler selects the next users not only by looking at the position in the ranking list but also by considering the spatial information. A basic exemplary balancing criterion is to equalize as much as possible the number of users served in each beam.

The balancing criteria can be further enhanced by considering the expected total transmitted power in each beam rather than the number of users served in each beam. This enhancement ensures a direct control over the interference generated in each beam even if it requires more information, such as measurements of the total power per beam.

Referring to FIG. 6 and Table I, the scheduler may first select the UE at the top of the list (UE5) and the RBS then assigns the power and channelization code resources to be used. However, instead of selecting UE3, the next users selected by the scheduler after UE5 could for example be: UE1, UE4, and UE2.

In other words, an exemplary procedure could start by selecting the best (e.g. with the best CQI) ranked user of all considered users. This user is located in a specific cell portion #1 (served by a corresponding narrow beam) as identified by the spatial information (e.g. S-CPICH). Instead of simply selecting the second best ranked user, the scheduler finds the best user which is located in another cell portion. The scheduler goes down the ranking list to find the next cell portion #2 and selects the user equipment UE1 at that position in the list. The procedure continues by traversing the list towards lower rankings to find the next cell portion #4 and selecting the corresponding user equipment UE4. Subsequently, the next cell portion is #3 and the corresponding user equipment is UE2. The scheduler can now start over and then finds UE3 in cell portion #1, UE6 in cell portion #4 and UE7 in cell portion #2.

The basic "rule" can be broken in case there are no users and/or radio resources left in one particular beam but still there are radio resources and users to be served in other beams. In that case the advanced algorithm may continue to balance the resources among the remaining beams. In the example of FIG. 6, there are no users left in the third beam; however, as explained, the algorithm continues to balance the resources among the other beams and selects UE3, UE6, and UE7.

An advantage with the proposed solution is that the interference in the system will be more predictable and hence the validity of the reported CQI will increase. When using the scheduling principle disclosed here, the interference seen from other cells will typically appear "whiter" in the spatial domain. This will then be reflected in the CQI measurement where the fluctuations (due to interference) will be much smaller. This will reduce the number of re-transmissions needed since the validity of a received CQI will be longer. This will in a multi-user scheduling scenario, as a consequence, result (with large probability) in a substantially improved throughput rate as well as individual peak rates both in the specific cell as well for the neighboring cells.

In addition, one or more of the users may have different services (with different priority levels and/or data rate requirements) such as (IP) voice service, e-mail service and/ or some form of more advanced media service that are scheduled, for each considered user, according to priority and/or data rate requirements, while still adhering to the overall principle of beam balancing. In other words, the various services are preferably scheduled over time based on the overall principle of balancing the power resources among different antenna beams while efficiently utilizing the available resources. Depending on the available resources, the number and/or types of services that are scheduled for the user(s) based on the beam balancing principle may thus vary over time. One or more users may have to temporarily pause low priority services in order to allow activation of more important services or more advanced media services for the same or other users. This also means that several mobile users with low data rate services may be scheduled to a particular beam, whereas only a single user with a more advanced service may be scheduled to another beam.

For the interested reader, basic information on HSDPA can be found in the relevant 3GPP specifications, and on pages 69-92 in the Ph.D. Thesis "*Packet Scheduling and Quality of Service in HSDPA*" by P. José and A. Gutiérrez, October 2003.

The embodiments described above are merely given as examples, and it should be understood that the present invention is not limited thereto. Further modifications, changes and improvements which retain the basic underlying principles disclosed herein are within the scope of the invention.

The invention claimed is:

1. A method for multi-user resource scheduling in a radio communication system having a radio base station with narrow beam capabilities, wherein said method is based on selecting multiple mobile users to be scheduled for service using multiple narrow antenna beams during a predetermined transmission time interval, characterized by:

selecting, for each antenna beam of at least a subset of said multiple antenna beams, at least two mobile users for service using the respective antenna beam during said transmission time interval; and distributing power resources to the antenna beams for use during said transmission time interval based on balancing the power resources among different antenna beams, wherein said narrow antenna beams are partially overlapping, and said step of distributing power resources to the antenna beams comprises the step of allocating, when there are no active mobile users in a given beam, more power resources to antenna beams that are direct neighbors of the given antenna beam than to more distant antenna beams to balance the power resource distribution over the whole area covered by the cell.

2. The method of claim 1, wherein the power resources are distributed among the different antenna beams in order to smooth the interference levels over the whole area covered by the cell and to reduce interference fluctuations.

3. The method of claim 1, wherein said step of selecting comprises the steps of providing a ranking list of mobile users in a cell and at the same time keeping track of spatial information represented by the narrow antenna beam in which each mobile user is located.

4. The method of claim 1, wherein said selecting step comprises the steps of selecting a best ranked mobile user from the ranking list for service by a given narrow antenna beam, and then traversing the ranking list to select the following users not only by looking at the position in the ranking list but also by considering the spatial information so that a next user down in the list is located in another narrow antenna beam different from that of previously selected user(s) higher up in the ranking list, and once the end of the list is encountered the selection procedure starts over at least one time from the top of the list to select further mobile users.

5. The method of claim 1, wherein said steps of selecting and distributing are performed for each transmission time interval.

6. The method of claim 1, wherein at least one user is associated with a number of different services, and these services are scheduled based on balancing the power resources among different antenna beams such that the number and/or types of services that are scheduled for said at least one user vary over time in dependence on the available resources.

7. An arrangement for use in a cellular radio communication system, said arrangement configured for generating multiple antenna beams associated with a communication cell, each beam covering only a portion of the cell, the arrangement further configured for selecting multiple mobile users to be scheduled for service using multiple antenna beams during a predetermined transmission time interval, the arrangement comprising:
a processor configured for:
selecting, for each antenna beam of at least a subset of said multiple antenna beams, at least two mobile users for service using the respective antenna beam during said transmission time interval; and
distributing power resources to the antenna beams for use during said transmission time interval based on balancing the power resources among different antenna beams, wherein said narrow antenna beams are partially overlapping, and said
processor is further configured for allocating, when there are no active mobile users in a given beam, more power resources to antenna beams that are direct neighbors of the given antenna beam than to more distant antenna beams to balance the power resource distribution over the whole area covered by the cell.

8. The arrangement of claim 7, wherein said processor is further configured for providing a ranking list of mobile users in a cell and for keeping track of spatial information represented by the narrow antenna beam in which each mobile user is located.

9. The arrangement of claim 7, wherein said processor is further configured for selecting a best ranked mobile user from the ranking list for service by a given narrow antenna beam, and traversing the ranking list to select the following users not only by looking at the position in the ranking list but also by considering the spatial information so that a next user down in the list is located in another narrow antenna beam different from that of previously selected user(s) higher up in the ranking list, and once the end of the list is encountered starting the selection procedure over at least one time from the top of the list to select further mobile users.

10. The arrangement of claim 7, wherein said arrangement is implemented in at least one network node of said radio communication system.

11. The arrangement of claim 10, wherein said at least one network node includes a radio base station.

* * * * *